United States Patent
Axmon et al.

(10) Patent No.: US 10,285,158 B2
(45) Date of Patent: May 7, 2019

(54) METHOD AND ARRANGEMENT FOR TRIGGERING PAGING PROFILING

(71) Applicant: Telefonaktiebolaget LM Ericsson (publ), Stockholm (SE)

(72) Inventors: Joakim Axmon, Kavlinge (SE); Ali Nader, Malmo (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 47 days.

(21) Appl. No.: 15/317,952

(22) PCT Filed: Jun. 17, 2014

(86) PCT No.: PCT/EP2014/062641
§ 371 (c)(1),
(2) Date: Dec. 11, 2016

(87) PCT Pub. No.: WO2015/192883
PCT Pub. Date: Dec. 23, 2015

(65) Prior Publication Data
US 2017/0118738 A1 Apr. 27, 2017

(51) Int. Cl.
*H04W 84/02* (2009.01)
*H04W 68/00* (2009.01)
(Continued)

(52) U.S. Cl.
CPC ......... *H04W 68/005* (2013.01); *H04L 43/106* (2013.01); *H04W 4/14* (2013.01);
(Continued)

(58) Field of Classification Search
CPC ....... H04W 4/02–4/025; H04W 4/029; H04W 4/06; H04W 4/08; H04W 4/12;
(Continued)

(56) References Cited

U.S. PATENT DOCUMENTS 6,289,227 B1  9/2001  Shi
8,452,311 B1 * 5/2013  Leshets ............... H04W 68/025
                                                  455/458

(Continued)

FOREIGN PATENT DOCUMENTS

EP   1643791 A1   4/2006
WO   2012035144 A1  3/2012
WO   2013134533 A1  9/2013

OTHER PUBLICATIONS

PCT International Search Report, dated Apr. 8, 2015, in connection with International Application No. PCT/EP2014/062641, all pages.

(Continued)

*Primary Examiner* — Charles N Appiah
*Assistant Examiner* — Xiang Zhang
(74) *Attorney, Agent, or Firm* — Leffler Intellectual Property Law, PLLC (57) ABSTRACT

A paging profiling method for determining a number of page repetition and a time interval between the page repetitions is disclosed. The method comprises triggering the paging profiling by causing a page relating to one or more wireless communication devices. In some embodiments the method may further comprise updating an entry of a paging pattern database based on the paging profiling, wherein the entry is associated with a geographical area in which the one or more wireless communication devices reside. The paging pattern database may, for example, be comprised in a server. In some embodiments, the method may also comprise detecting that the paging profiling is needed by detecting that the entry of the paging pattern database is not valid, and triggering the paging profiling may be enabled responsive to detecting that the paging profiling is needed. Corresponding paging profiling arrangement, computer program product, (Continued)

wireless communication device and server are also disclosed.

18 Claims, 3 Drawing Sheets

(51) Int. Cl.
    *H04W 68/02*      (2009.01)
    *H04L 12/26*      (2006.01)
    *H04W 4/14*      (2009.01)
    *H04W 24/10*      (2009.01)
    *H04W 76/30*      (2018.01)

(52) U.S. Cl.
    CPC ........... *H04W 24/10* (2013.01); *H04W 68/02* (2013.01); *H04W 76/30* (2018.02)

(58) Field of Classification Search
    CPC ..... H04W 4/14; H04W 4/20; H04W 28/0226; H04W 68/00; H04W 68/02–68/12
    See application file for complete search history.

(56) References Cited

U.S. PATENT DOCUMENTS

| | | | |
|---|---|---|---|
| 2005/0250474 A1* | 11/2005 | Hong | H04W 60/04 455/411 |
| 2010/0332910 A1* | 12/2010 | Ali | G06F 9/455 714/45 |
| 2011/0130100 A1 | 6/2011 | Chen et al. | |
| 2011/0294506 A1* | 12/2011 | Claussen | H04W 8/10 455/435.1 |
| 2013/0237257 A1* | 9/2013 | Walke | H04W 68/00 455/458 |
| 2014/0056197 A1 | 2/2014 | Deng | |
| 2016/0029344 A1* | 1/2016 | Vannithamby | H04W 76/00 455/458 |

OTHER PUBLICATIONS

PCT Written Opinion, dated Apr. 8, 2015, in connection with International Application No. PCT/EP2014/062641, all pages.
European Communication dated Jul. 5, 2018 in connection with European Application No. 14730898.5, 6 pages.

* cited by examiner

METHOD AND ARRANGEMENT FOR TRIGGERING PAGING PROFILING

TECHNICAL FIELD

The present invention relates generally to the field of paging in cellular communication networks. More particularly, it relates to paging profiling to establish a paging interval and a number of paging repetitions in a specific geographical area.

BACKGROUND

A wireless communication device that is in an idle mode in relation to a cellular communication network typically tune in to the base station of the camped-on cell at predetermined occasions, so called paging occasions, to check whether or not it is getting paged by the network. A device may be getting paged, for instance, if there is an incoming call for the wireless communication device.

Typically, when the wireless communication device is in idle mode it handles the mobility autonomously using neighbor cell information provided by the network. If the currently camped-on cell becomes weak and there is a stronger neighboring cell, the wireless communication device typically changes cell to the stronger neighboring cell. During this—so called—cell reselection, the wireless communication device is typically not monitoring paging and, hence, it may miss a page during this time. To prevent that the paging is missed (e.g. due to an interruption in paging monitoring caused by cell reselection), a cellular communication network typically repeats the paging one or more times until the wireless communication device responds.

In a typical cellular communication network, all base stations in a geographical area (e.g. a so called location (or tracking) area) where the wireless communication device has registered, send pages intended for the wireless communication device. When the wireless communication device reselects to a cell in another location (or tracking) area, e.g. due to crossing some geographical boundary, or changes to another radio access technology (RAT), it typically has to update the network on which geographical area it is currently in. This is typically done by a Location (or Tracking) Area Update procedure. Until the wireless communication device has completed updating the location (tracking) area, the cellular communication network will have outdated information regarding in which area to page the wireless communication device. To prevent that the paging is missed due to outdated location (or tracking) area information, the cellular communication network typically repeats the paging in adjacent location (tracking) areas if the wireless communication device does not respond to paging in the registered location (tracking) area.

The paging occasions follow a so called paging cycle, which is typically configured by the cellular communication network node. The paging cycle length typically depends on the applicable radio access technology standard.

Typically, the wireless communication device needs to start the radio each paging occasion, for example, to tune in to the serving cell downlink carrier, carry out automatic gain control (AGC), automatic frequency control (AFC) and update the timing of the serving cell before it can monitor paging.

Usage of a short paging cycle implies more such activities within a given time frame than if a longer paging cycle is used. This typically leads to higher power consumption and, in turn, consequently shorter stand-by time.

Another problem related to paging may be experienced for dual SIM dual standby (DSDS) wireless communication devices. Such a wireless communication device may monitor paging for a first SIM while having an ongoing connection (e.g. a packet switched—PS—connection) for a second SIM. When a DSDS device is implemented with a single radio it is typically necessary to puncture the ongoing connection of the second SIM at the paging occasions of the first SIM so that the radio may be tuned from one frequency (or cell) to another, listen for paging, and then be tuned back again.

Puncturing the ongoing connection will typically lead to a direct throughput loss, firstly due to that scheduled transmissions to and from the wireless communication device cannot be carried out (since the radio is tuned to another frequency/cell), and secondly due to that HARQ (hybrid automatic repeat request) acknowledgements for transport blocks correctly received immediately before the created gap cannot be transmitted (leading to that the network side may retransmit the data even though already successfully received).

Puncturing may also have an impact on residual BLER (block error rate) leading to retransmissions in higher layers (RLC—radio link control).

Furthermore, acknowledgements and/or channel quality reports that are not transmitted due to the puncturing may lead to that the network side applies a more robust MCS (modulation and coding scheme) for the wireless communication device, which leads to lower throughput.

As has been explained above, there is typically a redundancy in the paging which may be exploited by a wireless communication device, e.g. to lower the power consumption. However, it is typically only the available paging occasions that are defined according to the applicable cellular communication standard, while the repetition pattern (number of repetitions and interval between repetitions) of the paging is not standardized. Therefore, the wireless communication device needs to acquire such information to be able to balance power consumption requirements and/or throughput requirements against the probability to miss a page.

American patent publication US 2014/0056197 A1 discloses a method and apparatus for adjusting a wake-up period of a terminal in a communication system. A terminal determines whether a network-side device retransmits a paging message in the area in which the terminal is located. The terminal acquires a time interval at which the paging message is retransmitted and the number of times that the paging message is retransmitted, and adjusts its wake up period to a value equal to N times the time interval at which the paging message is retransmitted. The determination of whether the network-side device retransmits the paging message is triggered, for example, when the terminal enters a new location area, when the terminal is started, or through an instruction input by a user.

As will be understood in the following, there is a need for alternative approaches for triggering paging profiling. Preferably, the alternative approaches are more flexible and/or provide a more accurate result.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide alternative methods and arrangements for triggering paging profiling.

According to a first aspect, this is achieved by a paging profiling method for determining a number of page repetitions and a time interval between the page repetitions. The method comprises triggering the paging profiling by causing a page relating to one or more wireless communication devices.

In some embodiments, causing the page may comprise one or more of sending a dummy short message service (SMS) message to the one or more wireless communication devices, sending a dummy data packet to the one or more wireless communication devices, and causing a disconnection during an ongoing transmission to the one or more wireless communication devices. A dummy SMS message may, for example, be an empty SMS message. A dummy data packet may, for example, be an empty data packet.

The caused page relating to one or more wireless communication devices may be a dummy page (i.e. a page that does not relate to an actual communication being established, e.g. an empty SMS message or an empty data packet) according to some embodiments. Alternatively or additionally, the caused page relating to one or more wireless communication devices may be a conventional page (i.e. a page that relate to an actual communication being established, e.g. setting up a deliberately disconnected ongoing transmission) according to some embodiments.

Triggering the paging profiling may be performed by a wireless communication device (e.g. causing a page to itself) and/or by a server (e.g. a cloud-based server causing a page to one or more wireless communication devices).

In some embodiments, the method may further comprise updating an entry of a paging pattern database based on the paging profiling, wherein the entry is associated with a geographical area in which the one or more wireless communication devices reside. The geographical area may, for example, be a cell, a location area (LA) or a tracking area (TA). Typically, the paging pattern database may have respective entries for a plurality of geographical areas. The paging pattern database may be housed in a wireless communication device and/or in a server.

According to some embodiments, the method may further comprise detecting that the paging profiling is needed by detecting that the entry of the paging pattern database is not valid. In such embodiments, triggering of the paging profiling is enabled responsive to detecting that the paging profiling is needed. Detecting that the paging profiling is needed may, for example, be responsive to a paging pattern database query associated with the geographical area.

The entry being not valid may, for example, comprise one or more of the following situations: that the entry is missing, that the value of the entry is outdated (e.g. that a duration since a time stamping of the value is larger than a threshold), and that the value of the entry is not considered reliable (e.g. because it is based on insufficient statistics—too few profiling measurements and/or measurements from too few wireless communication devices).

An entry may be non-valid for a paging pattern database of a wireless communication device if the wireless communication device has not been in the geographical area earlier, if it has not stored any paging profile for the geographical area, or if the stored paging profile for the geographical area is too old.

An entry may be non-valid for a paging pattern database of a server if the server does not have any paging profile for the geographical area, of if the server does not have a reliable paging profile for the geographical area (e.g. too old, to few measurements, too few wireless communication devices, etc.).

Other approaches to when the paging profiling may be triggered include triggering:
- depending on the current and/or recent activity level of the wireless communication device (e.g. triggering when the device has been in idle mode for some specified time period),
- depending on the time of day (e.g. triggering during low-traffic hours),
- when the wireless communication device is about to transfer to idle mode,
- depending on the radio conditions (e.g. triggering only if the radio conditions are considered to be good, for example if a received signal strength/quality is above a radio condition threshold),
- depending on the amount of traffic in a cell or other geographical area where the wireless communication device resides (e.g. triggering only if the amount of traffic is below a traffic amount threshold),
- depending on velocity parameters of the wireless communication device (e.g. triggering when the wireless communication device is considered to be stationary, or when mobility of the wireless communication device is considered to be low),
- depending on system parameters (e.g. triggering when paging cycle is less than a maximum paging cycle length).

Such approaches may be used alone or in any combination with each other and/or the approach of detecting that the entry of the paging pattern database is not valid.

According to some embodiments, the method may be performed by a server comprising the paging pattern database. Then, the method may further comprise receiving a measurement report indicative of the number of page repetitions and the time interval between the repetitions from at least one of the one or more wireless communication devices, and updating the entry of the paging pattern database may be based on the measurement report.

The server may be a cloud-based server. Typically, the server is not a part of the cellular communication network in the sense that it does not have a priori knowledge of the paging parameters (number of repetitions and interval between repetitions).

The server may be operated by a cellular communication network operator or by an independent party. The data may be shared for a number of cellular communication network operators.

Updating the entry of the paging pattern database may, in some embodiments, be further based on a plurality of earlier received measurement reports.

For example, when the server is set up, it may (for each geographical area it is to cover) start with triggering an initial paging profiling from one or more wireless communication devices or it may be set up with default values.

Subsequently, it may trigger new paging profiling from one or more wireless communication devices at various triggering occasions. The triggering occasions may, for example, be when an entry is lacking, is too old, un-reliable, etc. Alternatively or additionally, the triggering occasions may be controlled by other parameters as has been elaborated on above (e.g. time of day, velocity of wireless communication device, etc.).

The one or more wireless communication devices may comprise all wireless communication devices residing in a geographical area of interest or a subset thereof.

When a measurement report(s) for a subsequent triggering is received, the server may update the entry in any suitable way based on the received measurement report(s).

For example, the new entry value may be a weighted average of the old entry value and the value(s) of the received measurement report(s).

Alternatively or additionally, the server may use the $90^{th}$ percentile or the median (for example) of a number X of most recent reports as entry value (repetition count and/or time interval between repetitions). Using the $90^{th}$ percentile (or another suitable metric) has the benefit of filtering out erroneous reports.

In parallel to the above, the server may, according to some embodiments, track changes in a number Y of most recent reports (where Y<X) to detect early whether it is likely that there has been a reconfiguration of the network. If it is determined that it is likely that there has been a reconfiguration of the network, the server may invalidate any previously deduced entry value or consider any previously deduced entry value to be less reliable.

Alternatively or additionally, the server may use the maximum values according to the number X and the number Y of reports (where Y<X) whereby early detection of network reconfiguration is enabled. In some embodiments, the resulting number of repetitions minus one repetition is used as an entry.

Yet alternatively or additionally, a suitable hysteresis may be used. For example, the server may increase the entry for number of repetitions only after a number N out of a number M of most recent reports indicate a higher number of repetitions, but may decrease the entry for number of repetitions already after a number L out of a number M of most recent reports indicate a lower number of repetitions (where L<<N).

In some embodiments, the method may further comprise time stamping the entry of the paging pattern database in association with updating the entry. In such embodiments, the entry may be considered not valid if the time stamp is older than a corresponding threshold.

The server may be shared between two or more cellular communication network operators.

According to some embodiments, the method may be performed by a wireless communication device. Then, the page relating to one or more wireless communication devices may consist of a page to the wireless communication device itself, and the method may further comprise measuring the number of page repetitions and the time interval between the repetitions and adjusting page reading times of the wireless communication device based on the number of page repetitions and the time interval between the repetitions.

Adjusting the page reading times may, for example, comprise determining whether or not to listen for paging at every possible paging occasion. For example, if there are many repetitions, it may be possible to listen to paging at less than every paging occasion to save power and/or increase throughput without severely increasing the risk of missing a page and if the time interval between repetitions is large, it may be unnecessary to listen to paging at less than every paging occasion.

If the wireless communication device comprises the paging pattern database, updating the entry of the paging pattern database may be based on the measured number of page repetitions and the time interval between the repetitions.

If the paging pattern database is comprised in a server, the method as performed by the wireless communication device may further comprise transmitting a measurement report indicative of the measured number of page repetitions and the time interval between the repetitions to the server.

In some embodiments, measuring the number of page repetitions and the time interval between the repetitions may comprise terminating the measurements if a maximum number of repetitions are detected.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is a paging profiling arrangement for determining a number of page repetitions and a time interval between the page repetitions. The arrangement comprises a paging profiling initiator adapted to trigger the paging profiling by causing a page relating to one or more wireless communication devices.

In some embodiments, the arrangement may further comprise means to update an entry of a paging pattern database based on the paging profiling, wherein the entry is associated with a geographical area in which the one or more wireless communication devices reside.

According to some embodiments, the arrangement may further comprise a detector adapted to detect that the paging profiling is needed by detecting that the entry of the paging pattern database is not valid. Then, the paging profiling initiator is adapted to enable triggering of the paging profiling responsive to the detector detecting that the paging profiling is needed.

In some embodiments, the page relating to one or more wireless communication devices may consist of a page to a wireless communication device comprising the arrangement. In these embodiments, the arrangement may further comprise a measuring unit adapted to measure the number of page repetitions and the time interval between the repetitions, and an adjustment unit adapted to adjust page reading times of the wireless communication device based on the number of page repetitions and the time interval between the repetitions. When the paging pattern database is comprised in a server, the arrangement may further comprise a controller adapted to cause transmission of a measurement report indicative of the number of page repetitions and the time interval between the repetitions to the server.

In some embodiments, the arrangement may further comprise the paging pattern database and a database management unit adapted to update the entry. If the arrangement is comprised in a server, the database management unit adapted to update the entry based on a received measurement report indicative of the number of page repetitions and the time interval between the repetitions from at least one of the one or more wireless communication devices. If the database is comprised in a wireless communication device the database management unit adapted to update the entry based on the measured number of page repetitions and the time interval between the repetitions.

A fourth aspect is a server comprising the arrangement according to the third aspect or suitable embodiments thereof.

A fifth aspect is a wireless communication device comprising the arrangement according to the third aspect or suitable embodiments thereof.

In some embodiments, the third, fourth and fifth aspects may additionally have features identical with or corresponding to any of the various features as explained above for the first aspect.

A general advantage of paging profiling is the possibility to balance throughput and/or power consumption against the probability to miss a page.

An advantage of some embodiments is that a flexible paging profiling is provided. The flexibility may, for example, be provided by means of the possibility to trigger the paging profiling at a suitable time by causing a page for this purpose.

Another advantage of some embodiments is that a more reliable paging profile is provided. The reliability may, for example, be provided by means of the server collecting a plurality of paging profiling measurement reports from several wireless communication devices, thereby providing a substantial statistical basis. Alternatively or additionally, the reliability may be provided by means of the possibility to trigger the paging profiling when measuring conditions are good (e.g. stationary wireless communication device, beneficial radio conditions, etc.).

Yet another advantage of some embodiments is that the paging profiling may be triggered when it interferes as little as possible with the normal operation of the wireless communication device and/or the system. This benefit may, for example, be achieved by the possibility to trigger paging profiling when a wireless communication device has been in idle mode for a long period of time, during night-time, when traffic load is low, etc.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where paging profiling (determining a number of page repetitions and a time interval between the page repetitions) is performed by one or more wireless communication devices (hereinafter also referred to as devices). The paging profiling may, for example, be used to optimize a tradeoff between the probability to miss a page and power consumption and/or throughput.

A drawback with paging profiling approaches of the prior art is that the quality (reliability) of the paging profiling may vary. For example, if the profiling is triggered (by entering a new location area, by starting a terminal, or by inputting an instruction by a user) when radio conditions are poor, the result of the paging profiling measurements may not be adequate (e.g. because an actual page is not detected).

Therefore, embodiments are presented herein where triggering the paging profiling is done by causing a page relating to one or more wireless communication devices. Thus, the timing of the paging profiling becomes flexible. In this way, it is possible to perform the paging profiling under favorable conditions. Furthermore, it is possible to perform the paging profiling when it interferes as little as possible with other operations of the device and/or of the communication system as a whole.

In some embodiments herein, a server collects paging profiling information from several devices in a paging pattern database, which increases the reliability even further. Another advantage of these embodiments is that a device that enters a geographical area for which it has no stored paging profile does not necessarily have to perform a paging profiling right away (or at all) to be able to optimize the tradeoff indicated above. Instead, such a device may query the paging pattern database of the server and receive paging profiling information as measured by other devices. Alternatively, a device performing a geographical area update procedure towards the network may receive (as part of the update procedure) paging profiling information from the paging pattern database of the server as measured by other devices. In this way, fewer paging profiling measurements are typically needed on the average since devices may benefit from profiling performed by other devices.

Some embodiments will now be described with reference to FIGS. 1 and 2.

Figure 1:
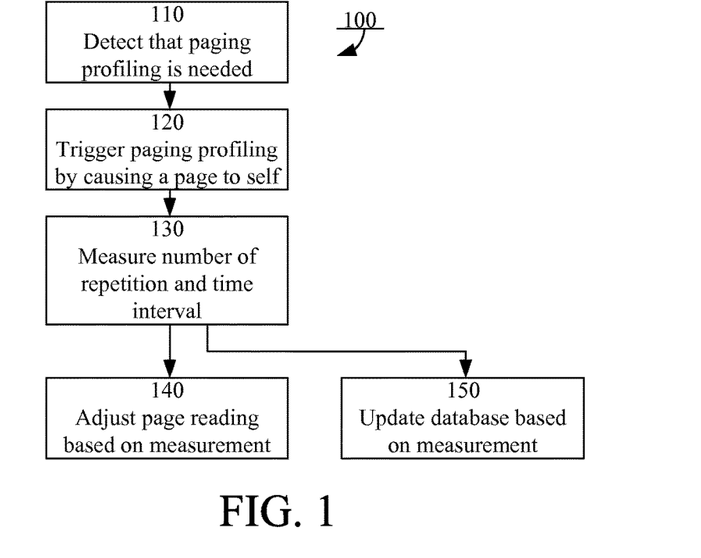
FIG. 1 is a flowchart illustrating example method steps according to some embodiments.

FIG. 1 illustrates an example method 100 according to some embodiments, which may be performed by a wireless communication device.

In step 110, the device performing the method 100 detects that paging profiling is needed. This may, for example, comprise entering a new geographical area (e.g. tracking/location area), querying a paging profiling database (either comprised in the device itself and relating to earlier paging profiling measurements by the device or comprised in a server and relating to paging profiling measurements by a plurality of devices) to retrieve a paging profile for the geographical area, and detecting that there is no valid entry in the database for the geographical area in question.

Subsequently, in step 120, the device triggers paging profiling by causing a page to itself. Since the paging profiling is not triggered until the self-page is caused, the timing of the triggering may be adapted so that (when the paging profiling is to be performed) e.g. radio conditions are favorable, velocity is favorable, the activity of the device is low, etc, as has been elaborated on above.

Causing the page may, for example, comprise the device sending an SMS message to itself or sending a data packet to itself.

In step 130, the device measures the number of repetitions of a page and the time interval between page repetitions in any suitable manner.

The result of the measurements may be used to adjust page reading in step 140 (e.g. to trade off power consumption and/or throughput against the probability to miss a page).

The result of the measurements may also be used to update the paging pattern database in step 150. If the paging pattern database is comprised in the device, step 150 may comprise storing the result of the measurement. If the paging pattern database is comprised in a server, step 150 may comprise sending a paging profiling measurement report to the server.

Figure 2:
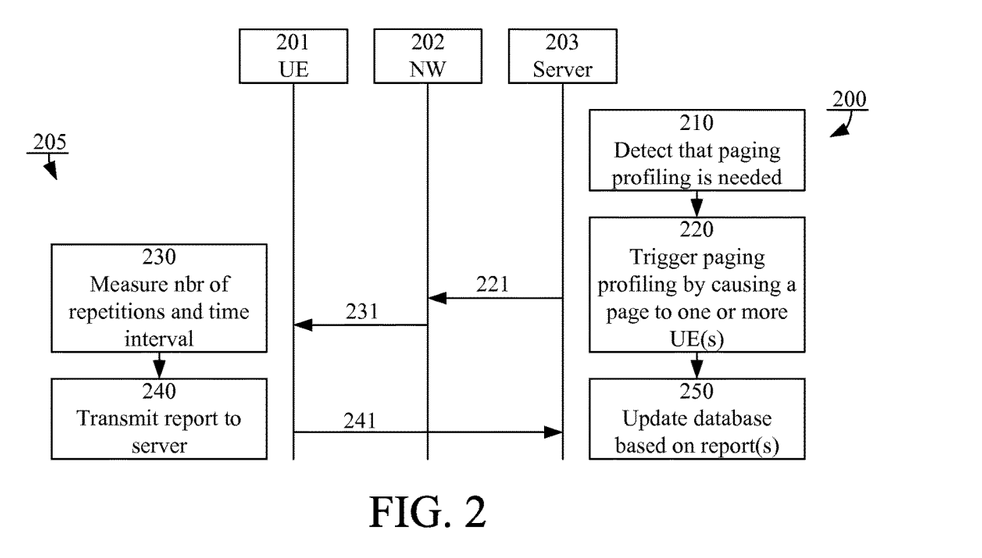
FIG. 2 is a combined flowchart and signaling diagram illustrating example method steps and signals according to some embodiments.

FIG. 2 illustrates an example method 200 according to some embodiments, which may be performed by a server 203. FIG. 2 also illustrates a corresponding example method 205, which may be performed by a wireless communication device (UE) 201, and corresponding signaling between the server and the wireless communication device.

In step 210, the server 203 detects that paging profiling is needed. This may, for example, comprise detecting that it lacks a paging profile for a particular geographical area, or that a stored paging profile for a particular geographical area is not reliable (e.g. because it is too old, because it is based on too few measurements, and/or because it is based on measurements from too few devices).

Subsequently, in step 220, the device triggers paging profiling by causing a page to the device 201 (and possibly also to other devices) that currently resides in the relevant geographical area. Since the paging profiling is not triggered until the page is caused, the timing of the triggering may be adapted so that (when the paging profiling is to be performed) e.g. radio conditions are favorable, velocity is favorable, the activity of the device is low, etc, as has been elaborated on above. In the scenario of FIG. 2, the device 201 operates in connection with a cellular communication network (NW) 202 and causing the paging is illustrated by the transmission of a suitable message 221 (e.g. an SMS message or a data packet intended for the device) from the server 203 to the network 202, which in turn transmits a page 231 to the device 201. Alternatively or additionally, the server may cause the page by disrupting an ongoing connection (e.g. disable a bearer or similar) with the device while there is data pending for transmission.

In step 230, the device measures the number of repetitions of the page 231 and the time interval between page repetitions in any suitable manner.

The result of the measurements is transmitted to the server in step 240 by way of a measurement report 241, which is received by the server 203 and used in step 250 to update the paging pattern database.

As in FIG. 1, the result of the measurements may also be used to adjust page reading by the device (not shown).

As mentioned above, the profiling may be initiated only when the device is assumed to be stationary (or moving slowly) according to some embodiments. An advantage of such an approach is that there is less risk that a new cell (potentially from a new location/tracking area) will be re-selected during the profiling process. Detection of device velocity may be achieved by any suitable known or future method. For example, cell timings, signal strength, and/or signal quality may be monitored and if the monitored parameters are stable over time it may indicate that the device is stationary.

In some embodiments, the paging profiling may be initiated only provided that particular requirements relating to system parameters are fulfilled. For example, it might be required that a paging cycle is less than a threshold cycle time (e.g. equal to the maximum cycle time) for the profiling to be carried out, and/or for sparser paging monitoring to be applied. Application of such an approach avoids very long latencies before the device responds to paging. Application of such an approach can also be justified by there being little possibilities for further optimization with regard to power consumption and/or throughput with an already sparse monitoring of paging.

Figure 3:
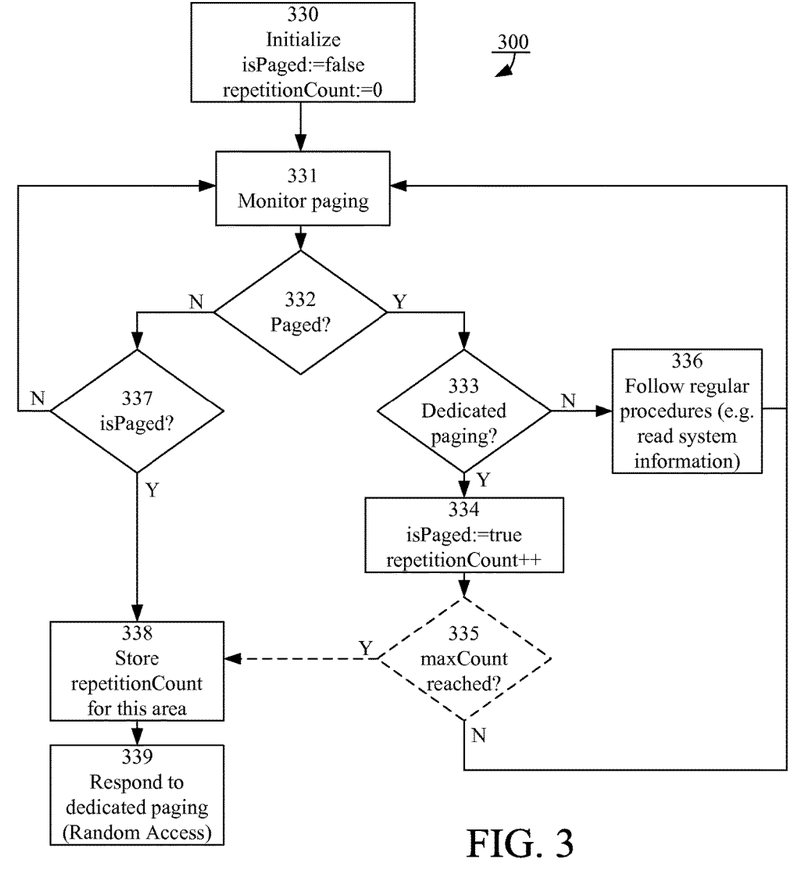
FIG. 3 is a flowchart illustrating example method steps according to some embodiments.

FIG. 3 illustrates an example method 300 of a device measuring the number of repetitions of a page according to some embodiments (compare with steps 130 and 230 of FIGS. 1 and 2 respectively). The time interval between page repetitions is considered known in this example (typically provided in the system information).

The paging profiling starts in step 330 where a parameter (isPaged) indicating whether the device is paged is initialized to "false" and a counter (repetitionCount) indicating the number of detected paging repetitions is initialized to 0.

The paging occasions are then monitored in step 331. In a typical paging profiling process all paging occasions are monitored (even if an adjusted page reading is otherwise applied, compare e.g. with step 140 of FIG. 1). Also in a typical paging profiling process, monitoring of paging occasions continues even if a page is detected (i.e. the page is not responded to until the profiling is completed) to provoke paging repetition.

If a page is received in the monitored paging occasion (Y-path out from step 332) and if the received page is dedicated for the device (Y-path out from step 333) then isPaged is updated to "true" and repetitionCount is incremented in step 334.

After step 334, if not a maximum number of repetitions (maxCount) are reached (N-path out from 335) then monitoring (of the next paging occasion) continues in step 331. If the maximum number of repetitions (maxCount) is reached (Y-path out from 335), then the number of repetitions of a page (repetitionCount) is stored for the geographical area in question (step 338) and the dedicated paging is responded to, e.g. by random access (step 339).

The maximum number of repetitions may correspond to a standardized number, a number signaled by the network, or a number set by the device itself. One purpose of applying a maximum number of repetitions is to avoid an overly long delay until a paging response is sent by the device, which is particularly useful if the page is not a dummy page. In some embodiments, the device may set maxCount to 2.

The check regarding maxCount is optional according to some embodiments as indicated by the dashed parts of FIG. 3.

If the received page is common (N-path out from step 333), the device follows a regular procedure in step 336 (e.g. reading system information update, public warning, etc) after which monitoring (of the next paging occasion) continues in step 331.

If a page is not received in the monitored paging occasion (N-path out from step 332) monitoring (of the next paging occasion) continues in step 331 if isPaged is "false" (N-path out from step 337) i.e. if the device was not paged in the previous paging occasion either. Otherwise, if isPaged is "true" (Y-path out from step 337) i.e. if the device was paged in the previous paging occasion, all repetitions of the page has been counted so the number of repetitions of a page (repetitionCount) is stored for the geographical area in question (step 338) and the dedicated paging is responded to, e.g. by random access (step 339). The paging profiling is terminated once step 339 is reached.

Generally, paging profiling may typically be terminated if the device exits from the geographical area under consideration and/or if the conditions (velocity, signal strength, etc.) deteriorates. If the paging profiling is terminated prematurely, the result is typically not used for updating of the paging pattern database. If the paging profiling is terminated prematurely, a new paging profiling may be triggered at a later point in time.

Also generally, there may be several alternatives by which a device is made active for paging profiling (i.e. configured to perform paging profiling when a page arrives, e.g. by performing steps 230 and 240 of FIG. 2 and/or the example method 300 of FIG. 3).

In one example that requires no server interaction, the device encounters a cell for which it does not know the paging repetition and/or the time interval between repetitions (i.e. these parameters are not part of the history information). Then, the device may configure itself for paging profiling, send an SMS to itself, immediately release the connection (i.e. go to idle), and monitor paging. In a typical embodiment, it is not relevant whether it receives a dummy page due to the SMS from itself or another page to it, since the same repetition pattern applies (the network does not recognize any difference between the pages). In order to avoid bothering the user of the device with a notification of a new SMS the SMS message the device sends to itself could contain an unlikely combination of characters allowing the SMS to be filtered out and not shown to the user.

In an alternative or additional example that requires server interaction, the device finds when contacting the server (during a tracking area update for example) that there is no information regarding the cell the device is currently in. Then, the device may request the server to trigger paging (e.g. by sending a message to the device), release the connection (i.e. go to idle), and start the paging profiling. The server may typically wait some time after receiving the request to trigger paging from the device. Then, the server sends a message (e.g. an SMS) the device, by which the device gets an opportunity to perform paging profiling. In a typical embodiment, it is not relevant whether the device receives the page due to the server generated message or another page to it, since the same repetition pattern applies (the network does not recognize any difference between the pages).

Figure 4:
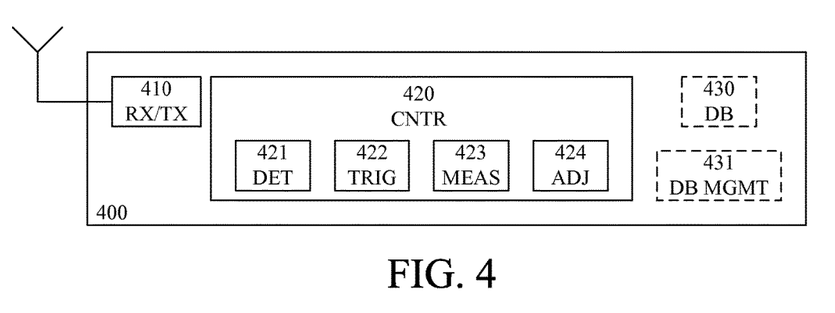
FIG. 4 is a schematic block diagram illustrating an example paging profiling arrangement according to some embodiments.

FIG. 4 illustrates an example paging profiling arrangement according to some embodiments. The example arrangement of FIG. 4 may, for example, be comprised in a wireless communication device 400 and may be adapted to perform the example method 100 as described in FIG. 1.

The arrangement comprises a transceiver (RX/TX) 410 adapted to receive and transmit pages and a controller (CNTR) 420. The controller 420 comprises a detector (DET) 421 adapted to detect that a paging profiling is needed (compare with step 110 of FIG. 1) and a paging profiling initiator (TRIG) 422 adapted to trigger the paging profiling by causing a page to itself (compare with step 120 of FIG. 1). The controller 420 also comprises a measuring unit (MEAS) 423 adapted to measure the number of page repetitions and the time interval between the repetitions (compare with step 130 of FIG. 1) and an adjustment unit (ADJ) 424 adapted to adjust page reading times of the wireless communication device based on the measurements (compare with step 140 of FIG. 1).

The arrangement may also comprise a paging pattern database (DB) 430 with an associated database management unit (DB MGMT) 431. In such embodiments, the controller 420 may be further adapted to cause the database management unit 431 to update the paging pattern database 430 (compare with step 150 of FIG. 1).

If a paging pattern database is comprised in a server (not shown), the controller 420 may be further adapted to cause the transceiver 410 to transmit a measurement report to the server (compare with step 150 of FIG. 1).

Figure 5:
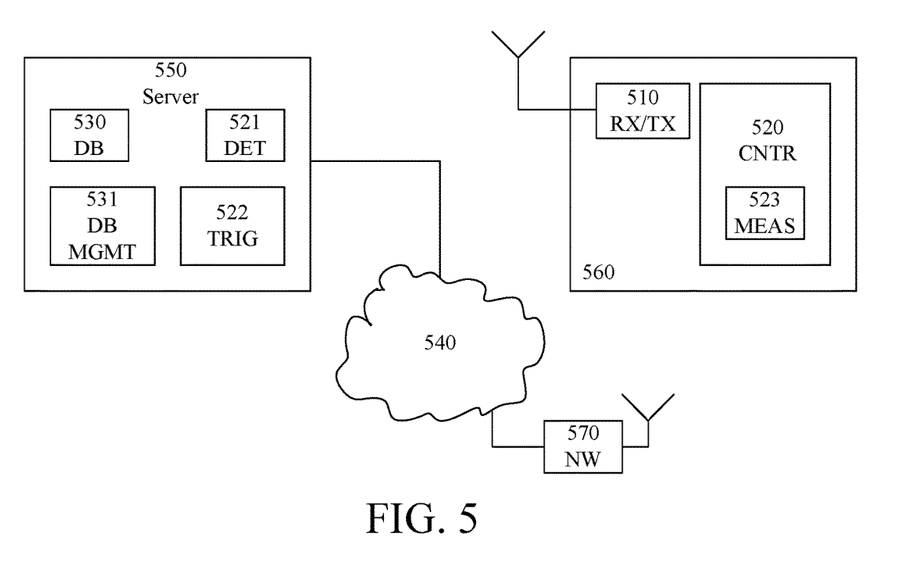
FIG. 5 is a schematic block diagram illustrating an example paging profiling arrangement according to some embodiments.

FIG. 5 illustrates an example paging profiling arrangement according to some embodiments. The example arrangement of FIG. 5 may, for example, be comprised in a server 550 and may be adapted to perform the example method 200 as described in FIG. 2. The server 550 may be cloud-based as illustrated by 540.

The arrangement comprises a detector (DET) 521 adapted to detect that a paging profiling is needed (compare with step 210 of FIG. 2) and a paging profiling initiator (TRIG) 522 adapted to trigger the paging profiling by causing a page to one or more devices 560 residing in a geographical area of interest (compare with step 220 of FIG. 2) and operating in relation to a cellular communication network (NW) 570 which is reachable via the cloud 540.

The one or more devices 560 each comprises a transceiver (RX/TX) 510 adapted to receive pages and a controller (CNTR) 520. The controller 520 comprises a measuring unit (MEAS) 523 adapted to measure the number of page repetitions and the time interval between the repetitions (compare with step 230 of FIG. 2). The controller 520 is further adapted to cause the transceiver 510 to transmit a measurement report to the server (compare with step 240 of FIG. 2).

The arrangement also comprises a paging pattern database (DB) 530 with an associated database management unit (DB MGMT) 531. The database management unit 531 is adapted to update the paging pattern database 530 based on the measurement report(s) from the one or more devices 560 (compare with step 250 of FIG. 2).

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a server) comprising circuitry/logic or performing methods according to any of the embodiments. The electronic apparatus may, for example, be a portable or handheld mobile radio communication equipment, a mobile radio terminal, a mobile telephone, a user equipment, a communicator, an electronic organizer, a smartphone, a computer, a notebook, a mobile gaming device, or a cloud-based server.

Figure 6:
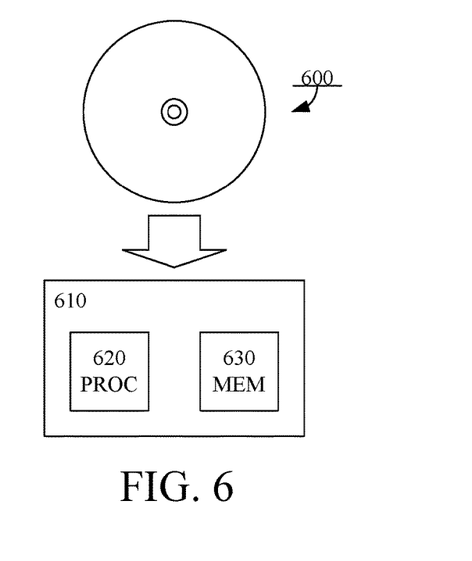
FIG. 6 is a schematic drawing illustrating an example computer program product according to some embodiments.

According to some embodiments, a computer program product comprises a computer readable medium such as, for example, a USB-stick, a plug-in card, an embedded drive, a diskette or a CD-ROM (such as the CD-ROM 600 illustrated in FIG. 6). The computer readable medium may have stored thereon a computer program comprising program instructions. The computer program may be loadable into a data-processing unit 620, which may, for example, be comprised in a mobile terminal 610. When loaded into the data-processing unit 620, the computer program may be stored in a memory 630 associated with or integral to the data-processing unit 620. According to some embodiments, the computer program may, when loaded into and run by the data-processing unit 620, cause execution of method steps according to, for example, the methods shown in any of FIGS. 1, 2 and 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The following list represents a few illustrative examples according to some embodiments:

1. A paging profiling method for determining a number of page repetitions and a time interval between the page repetitions, the method comprising:
    triggering (120, 220) the paging profiling by causing a page relating to one or more wireless communication devices.

2. The method of example 1 wherein causing the page comprises one or more of:
    sending a dummy short message service—SMS—message to the one or more wireless communication devices;
    sending a dummy data packet to the one or more wireless communication devices; and
    causing a disconnection during an ongoing transmission to the one or more wireless communication devices.

3. The method of any of examples 1 through 2 further comprising updating (150, 250) an entry of a paging pattern database based on the paging profiling, wherein the entry is associated with a geographical area in which the one or more wireless communication devices reside.

4. The method of any of examples 1 through 3 further comprising detecting (110, 210) that the paging profiling is needed by detecting that the entry of the paging pattern database is not valid, and wherein triggering the paging profiling is enabled responsive to detecting that the paging profiling is needed.

5. The method of any of examples 3 through 4 wherein the method is performed by a server comprising the paging pattern database, and wherein the method further comprises receiving a measurement report (241) indicative of the number of page repetitions and the time interval between the repetitions from at least one of the one or more wireless communication devices, and wherein updating (250) the entry of the paging pattern database is based on the measurement report.

6. The method of example 5 wherein updating the entry of the paging pattern database is further based on a plurality of earlier received measurement reports.

7. The method of any of examples 5 through 6 further comprising time stamping the entry of the paging pattern database in association with updating the entry and wherein the entry is considered not valid if the time stamp is older than a threshold.

8. The method of any of examples 5 through 7 wherein the server is shared between two or more cellular communication network operators.

9. The method of any of examples 3 through 4 wherein the method is performed by a wireless communication device, wherein the page relating to one or more wireless communication devices consists of a page to the wireless communication device itself, and wherein the method further comprises:
    measuring (130) the number of page repetitions and the time interval between the repetitions; and
    adjusting (140) page reading times of the wireless communication device based on the number of page repetitions and the time interval between the repetitions.

10. The method of example 9 wherein the wireless communication device comprises the paging pattern database, and wherein updating (150) the entry of the paging pattern database is based on the number of page repetitions and the time interval between the repetitions.

11. The method of example 9 wherein the paging pattern database is comprised in a server, the method further comprising transmitting a measurement report (241) indicative of the number of page repetitions and the time interval between the repetitions to the server.

12. The method of any of examples 9 through 11 wherein measuring the number of page repetitions and the time interval between the repetitions comprises terminating the measurements if (335) a maximum number of repetitions are detected.

13. A computer program product comprising a computer readable medium, having thereon a computer program comprising program instructions, the computer program being loadable into a data-processing unit and adapted to cause execution of the method according to any of examples 1 through 12 when the computer program is run by the data-processing unit.

14. A paging profiling arrangement for determining a number of page repetitions and a time interval between the page repetitions, the arrangement comprising:
    a paging profiling initiator (422, 522) adapted to trigger the paging profiling by causing a page relating to one or more wireless communication devices.

15. The arrangement of example 14 wherein the paging profiling initiator is adapted to cause the page by one or more of:
    sending a dummy short message service—SMS—message to the one or more wireless communication devices;
    sending a dummy data packet to the one or more wireless communication devices; and
    causing a disconnection during an ongoing transmission to the one or more wireless communication devices.

16. The arrangement of any of examples 14 through 15 further comprising means (420, 431, 531) to update an entry of a paging pattern database (430, 530) based on the paging profiling, wherein the entry is associated with a geographical area in which the one or more wireless communication devices reside.

17. The arrangement of example 16 further comprising a detector (421, 521) adapted to detect that the paging profiling is needed by detecting that the entry of the paging pattern database (430, 530) is not valid, and wherein the paging profiling initiator is adapted to enable triggering of the paging profiling responsive to the detector detecting that the paging profiling is needed.

18. The arrangement of any of examples 16 through 17 further comprising the paging pattern database and a database management unit (531) adapted to update the entry based on a received measurement report indicative of the number of page repetitions and the time interval between the repetitions from at least one of the one or more wireless communication devices.

19. The arrangement of any of examples 16 through 17, wherein the page relating to one or more wireless communication devices consists of a page to a wireless communication device comprising the arrangement, the arrangement further comprising:
  a measuring unit (423) adapted to measure the number of page repetitions and the time interval between the repetitions; and
  an adjustment unit (424) adapted to adjust page reading times of the wireless communication device based on the number of page repetitions and the time interval between the repetitions.

20. The arrangement of example 19 further comprising the paging pattern database and a database management unit (431) adapted to update the entry based on the number of page repetitions and the time interval between the repetitions.

21. The arrangement of example 19 wherein the paging pattern database is comprised in a server, the arrangement further comprising a controller (420) adapted to cause transmission of a measurement report indicative of the number of page repetitions and the time interval between the repetitions to the server.

22. A server comprising the arrangement of example 18.

23. A wireless communication device comprising the arrangement of any of examples 19 through 21.

The invention claimed is:

1. A paging profiling method for determining a number of page repetitions and a time interval between the page repetitions, the method comprising:
  detecting that the paging profiling is needed by detecting that a first entry of a paging pattern database is not valid, wherein the paging pattern database is comprised in a server and comprises a plurality of entries indicating paging profiling measurements made by a plurality of wireless communication devices, wherein the paging profiling measurements comprise the number of page repetitions and the time interval between the page repetitions, and wherein the first entry is associated with a geographical area in which a wireless communication device resides;
  triggering the paging profiling by causing a page relating to the wireless communication device, wherein triggering the paging profiling is enabled responsive to detecting that the paging profiling is needed; and
  updating the first entry of the paging pattern database based on the paging profiling.

2. The method of claim 1 wherein causing the page comprises one or more of:
  sending a dummy short message service message to the wireless communication device;
  sending a dummy data packet to the wireless communication device; and
  causing a disconnection during an ongoing transmission to the wireless communication device.

3. The method of claim 1, wherein the method is performed by the server comprising the paging pattern database, and wherein the method further comprises receiving a measurement report indicative of the number of page repetitions and the time interval between the repetitions from at least one of the wireless communication device and one or more other wireless communication devices, and wherein updating the first entry of the paging pattern database is based on the measurement report.

4. The method of claim 3 wherein updating the first entry of the paging pattern database is further based on a plurality of earlier received measurement reports.

5. The method of claim 3 further comprising time stamping the first entry of the paging pattern database in association with updating the first entry and wherein the first entry is considered not valid if the time stamp is older than a threshold.

6. The method of claim 3 wherein the server is shared between two or more cellular communication network operators.

7. The method of claim 1, wherein the method is performed by the wireless communication device, and wherein the method further comprises:
  measuring the number of page repetitions and the time interval between the repetitions; and
  adjusting page reading times of the wireless communication device based on the number of page repetitions and the time interval between the repetitions.

8. The method of claim 7, further comprising transmitting a measurement report indicative of the number of page repetitions and the time interval between the repetitions to the server.

9. The method of claim 7 wherein measuring the number of page repetitions and the time interval between the repetitions comprises terminating the measurements if a maximum number of repetitions are detected.

10. A non-transitory computer readable storage medium, having thereon a computer program comprising program instructions, the computer program being loadable into a data-processing unit and adapted to cause execution of a paging profiling method when the computer program is run by the data-processing unit, wherein the method is for determining a number of page repetitions and a time interval between the page repetitions, and wherein the method comprises:
  detecting that the paging profiling is needed by detecting that a first entry of a paging pattern database is not valid, wherein the paging pattern database is comprised in a server and comprises a plurality of entries indicating paging profiling measurements made by a plurality of wireless communication devices, wherein the paging profiling measurements comprise the number of page repetitions and the time interval between the page repetitions, and wherein the first entry is associated with a geographical area in which a wireless communication device resides;
  triggering the paging profiling by causing a page relating to the wireless communication device, wherein triggering the paging profiling is enabled responsive to detecting that the paging profiling is needed; and
  updating the first entry of the paging pattern database based on the paging profiling.

11. A paging profiling arrangement for determining a number of page repetitions and a time interval between the page repetitions, the arrangement comprising:
  a detector adapted to detect that the paging profiling is needed by detecting that a first entry of a paging pattern database is not valid, wherein the paging pattern database is comprised in a server and comprises a plurality of entries indicating paging profiling measurements made by a plurality of wireless communication devices, wherein the paging profiling measurements comprise the number of page repetitions and the time interval between the page repetitions, and wherein the first entry is associated with a geographical area in which a wireless communication device resides;

a paging profiling initiator adapted to trigger the paging profiling by causing a page relating to the wireless communication device, wherein triggering the paging profiling is enabled responsive to detecting that the paging profiling is needed; and means to update the first entry of the paging pattern database based on the paging profiling.

12. The arrangement of claim 11 wherein the paging profiling initiator is adapted to cause the page by one or more of:

sending a dummy short message service message to the wireless communication device;

sending a dummy data packet to the wireless communication device; and causing a disconnection during an ongoing transmission to the one or more wireless communication devices.

13. The arrangement of claim 11 further comprising the paging pattern database and a database management unit adapted to update the first entry based on a received measurement report indicative of the number of page repetitions and the time interval between the repetitions from at least one of the one or more wireless communication devices.

14. The arrangement of claim 11, wherein the page relating to one or more wireless communication devices consists of a page to a wireless communication device comprising the arrangement, the arrangement further comprising:

a measuring unit adapted to measure the number of page repetitions and the time interval between the repetitions; and an adjustment unit adapted to adjust page reading times of the wireless communication device based on the number of page repetitions and the time interval between the repetitions.

15. The arrangement of claim 14 further comprising a database management unit adapted to update the first entry based on the number of page repetitions and the time interval between the repetitions.

16. The arrangement of claim 14, further comprising a controller adapted to cause transmission of a measurement report indicative of the number of page repetitions and the time interval between the repetitions to the server.

17. The arrangement of claim 13, wherein the arrangement is comprised in the server.

18. A wireless communication device comprising the arrangement of claim 14.

* * * * *